(12) United States Patent
Stubbs et al.

(10) Patent No.: US 9,927,797 B2
(45) Date of Patent: Mar. 27, 2018

(54) SAFETY COMPLIANCE FOR MOBILE DRIVE UNITS

(71) Applicant: Amazon Technologies, Inc., Reno, NV (US)

(72) Inventors: Andrew Stubbs, Waltham, MA (US); Matthew David Verminski, North Andover, MA (US); Michael T. Barbehenn, North Reading, MA (US); Andrew Brenden Tinka, Cambridge, MA (US); Peter K. Mansfield, Bellevue, WA (US); Peter R. Wurman, Acton, MA (US)

(73) Assignee: Amazon Technologies, Inc., Reno, NV (US)

( * ) Notice: Subject to any disclaimer, the term of this patent is extended or adjusted under 35 U.S.C. 154(b) by 414 days.

(21) Appl. No.: 14/472,717

(22) Filed: Aug. 29, 2014

(65) Prior Publication Data

US 2016/0062345 A1 Mar. 3, 2016

(51) Int. Cl.
*G05B 19/4061* (2006.01)
*G05B 19/042* (2006.01)
(Continued)

(52) U.S. Cl.
CPC ............ *G05B 19/4061* (2013.01); *B25J 5/00* (2013.01); *B25J 9/1676* (2013.01);
(Continued)

(58) Field of Classification Search
CPC ............ G05B 19/4061; G05B 19/0428; G05B 19/41895; G05B 2219/40202;
(Continued)

(56) References Cited

U.S. PATENT DOCUMENTS

2004/0148039 A1* 7/2004 Farchmin ............. G05B 19/122
 700/79
2005/0171637 A1* 8/2005 Tani ....................... G05D 1/027
 700/245

(Continued)

FOREIGN PATENT DOCUMENTS

EP 2639019 9/2013
WO 2006065563 6/2006

OTHER PUBLICATIONS

PCT Search Report and Written Opinion dated Dec. 9, 2015, for PCT Application No. PCT/US2015/047024 (10 pages).

*Primary Examiner* — Courtney D Heinle
(74) *Attorney, Agent, or Firm* — Lee & Hayes, PLLC

(57) ABSTRACT

Techniques for making a physical area safe for a human to enter when mobile drive units (e.g., robots) are operating in the physical area are described. A management device may send an activity message to the mobile drive units instructing the mobile drive units to perform a set of activities. If a human is detected in the physical area, the management device may stop sending the activity command. If the mobile drive units do not receive the activity command, the mobile drive units may stop performing the set of activities. After the management device determines that the human has left the physical area, the management device may resume sending the activity message.

20 Claims, 9 Drawing Sheets

(51) Int. Cl.
   *G05B 19/418*  (2006.01)
   *G05D 1/02*   (2006.01)
   *B25J 5/00*   (2006.01)
   *B25J 9/16*   (2006.01)
(52) U.S. Cl.
   CPC ... *G05B 19/0428* (2013.01); *G05B 19/41895*
      (2013.01); *G05D 1/0214* (2013.01); *G05D*
      *1/0234* (2013.01); *G05D 1/0246* (2013.01);
      *G05D 1/0261* (2013.01); *G05B 2219/40173*
      (2013.01); *G05B 2219/40202* (2013.01); *G05D*
      *2201/0216* (2013.01); *Y02P 90/285* (2015.11);
      *Y02P 90/60* (2015.11); *Y10S 901/01* (2013.01)
(58) Field of Classification Search
   CPC ....... G05B 2219/40173; G05D 1/0234; G05D
            1/0214; G05D 1/0246; G05D 1/0261;
            B25J 5/00; B25J 9/1676; B25J 9/1674;
            Y10S 901/01; Y02P 90/285
   USPC ......................................................... 701/23
   See application file for complete search history.

(56)         References Cited

U.S. PATENT DOCUMENTS

2006/0161303 A1*  7/2006  Wang ..................... B25J 9/1689
                                                      700/259
2009/0043440 A1*  2/2009  Matsukawa .......... G05D 1/0214
                                                       701/25
2010/0114373 A1*  5/2010  Hale ....................... B25J 19/06
                                                      700/258
2011/0093134 A1*  4/2011  Emanuel ............... G05D 1/0289
                                                       701/2
2011/0121068 A1*  5/2011  Emanuel .................. G01S 5/16
                                                      235/375
2011/0184558 A1*  7/2011  Jacob ..................... B25J 9/1676
                                                      700/259
2011/0264266 A1*  10/2011 Kock ..................... B25J 9/1676
                                                      700/253
2012/0166034 A1*  6/2012  Wragg .................. G01S 5/0072
                                                       701/25
2012/0327190 A1*  12/2012 Massanell ............. B25J 9/1676
                                                       348/46
2013/0245821 A1*  9/2013  Nakamura ............... B25J 19/06
                                                      700/245
2014/0067121 A1*  3/2014  Brooks .................. B25J 9/1676
                                                      700/255
2014/0277723 A1*  9/2014  Nishimura ............. B25J 9/1676
                                                      700/255
2014/0277724 A1*  9/2014  Suyama ................. B25J 9/1676
                                                      700/255
2014/0277725 A1*  9/2014  Kouno ................... B25J 9/1676
                                                      700/255
2014/0350725 A1*  11/2014 LaFary .................. G06N 3/008
                                                      700/253

* cited by examiner

SAFETY COMPLIANCE FOR MOBILE DRIVE UNITS

BACKGROUND

An industrial robot is an electro-mechanical machine that is controlled by a computer program, electronic circuits, or both. The industrial robot may be either stationary or mobile (e.g., capable of navigating from one location to another location). For example, the industrial robot may have wheels (or another form of conveyance) to enable the industrial robot to navigate to different locations. Industrial robots that can navigate independently of each other may be referred to as mobile drive units (MDUs). The MDUs may be capable of performing activities using one or more arm-like mechanisms to grasp an item, release the item, etc. Based on the type of task that is to be performed, two or more MDUs may coordinate their respective activities to perform a task.

In an area (e.g., a factory, a warehouse, a materials handling facility or similar type of setting) where multiple MDUs are performing activities, under some circumstances, humans may enter the area. For example, plastic wrap used to cover a load of items may foul the wheels of an MDU. As another example, an item from the load of items may fall and obstruct the path of an MDU or partially damage an MDU. Under such circumstances, a human may enter the area to perform an activity such as removing the plastic wrap from the wheels of the MDU, removing an item obstructing the path of the MDU, or repairing the MDU. The MDUs may be instructed to perform one or more activities, such as transporting items between locations in a materials handling facility, transporting a shelving unit from one location to another, docking with a charging unit, handing off a trash container to a dumper unit, etc. When a human enters an area in which multiple MDUs have been instructed to perform one or more activities, the human may risk being inadvertently injured by one or more of the MDUs as the MDUs perform their activities.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
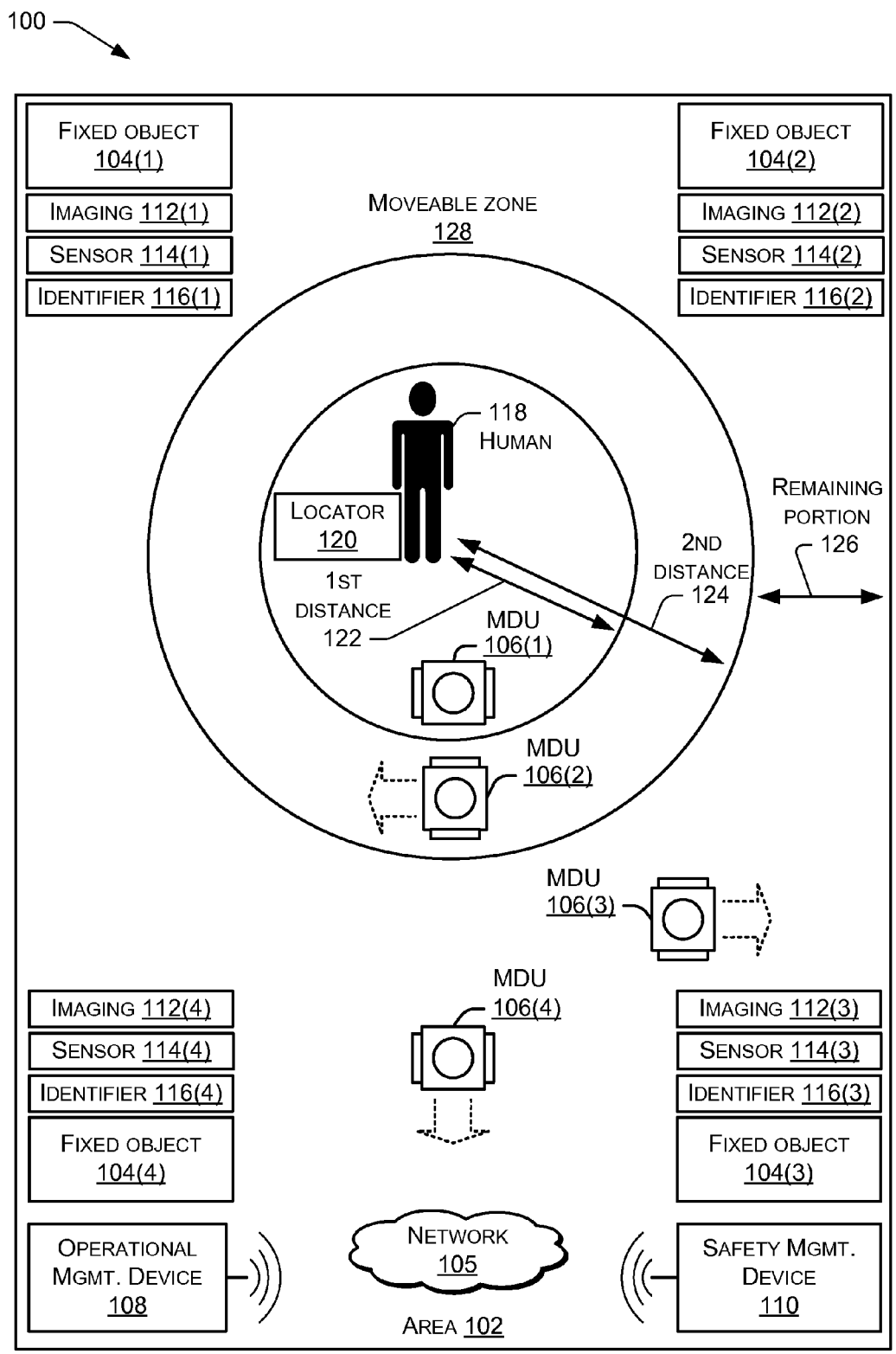
FIG. 1 is an illustrative architecture that includes instructing mobile drive units within a first distance from a human to stop performing physical activities according to some implementations.

The systems and techniques described herein may be used to provide a functionally safe environment for humans in an area in which mobile drive units (MDUs) are performing activities. For example, when a human is detected within an area in which MDUs are performing activities, a safety management device may instruct at least some of the MDUs to temporarily cease performing activities. As used herein, the term activity refers to physical activity, e.g., physical movement. Thus, during the time that the MDUs cease performing activities, the MDUs may continue to receive signals, transmit signals, perform computations, and perform other non-physical activities.

The human may wear a locator device that the safety management device or an MDU uses to determine a location of the human. When the safety management device or one of the MDUs determines that the human is located in or near an area in which MDUs are performing activities, MDUs within a first distance from the human may be instructed to temporarily cease performing a set of activities. In some cases, MDUs within a second distance from the human may be instructed to reduce their speed. Additionally, some of the MDUs may be instructed to navigate to a new location and then temporarily stop performing any activity. Thus, when the presence of a human is detected, a first set of MDUs may temporarily stop performing any activity, a second set of MDUs may reduce their speed of travel, and/or a third set of MDUs may retreat (e.g., navigate to a new location that is further away from the human) and then temporarily stop performing any activity.

An MDU may be a robotic (e.g., electro-mechanical) device that can be instructed to perform a set of activities and may be capable of navigating to different locations using a drive mechanism, such as wheels or other conveyance mechanism. The MDUs may be instructed to perform a set of activities. For example, each MDU may be instructed to receive a listing of items to be shipped to a particular address, retrieve the items from the listing from multiple locations (e.g., multiple bins of items), place the retrieved items in a container for shipment to the particular address, perform another type of task, or any combination thereof.

The location of the human may be determined using a variety of techniques. For example, the human may wear a locator device that transmits a signal, such as a radio frequency identifier (RFID). As another example, the human may wear a locator device that determines a position of the device (e.g., using a triangulation method, global positioning satellites (GPS), or the like) and sends the location information to the MDUs and/or to a management device that controls the MDUs. As a further example, the human may wear a device that transmits (e.g., broadcasts) a signal that may be triangulated using antennas placed at various locations within the area in which the MDUs are performing activities. As yet another example, the human may wear a device that reads (e.g., using optical recognition, RFID, etc.) identifiers, such as fiducial markers, that have been distributed throughout the area and sends data associated with the identifiers to enable the location of the human to be determined. As yet another example, imaging devices, such as cameras, placed at various locations in an area may be used to optically or visually determine a location of the human. As a further example, sensors (e.g., floor sensors, heat sensors, motion sensors, etc.) may be placed at various locations in an area to determine a location of the human. Of course, any combination of the previously mentioned techniques, potentially in combination with other location determination techniques, may be used to determine the location of the human.

The safety management device may track the locations of humans and the locations of MDUs. The safety management device may use various techniques to create a functionally safe environment for humans. For example, the safety management device may create one or more fixed (e.g., immovable) zones and track the location of humans entering and leaving the fixed zones. In some cases, the safety management device may not track the location of the humans within the fixed zones while in other cases the safety management device may track the location of the humans within the fixed zones. In some implementations, the safety management device may create a moveable zone around a human. For example, the safety management device may continually monitor a location of each human in an area, each MDU in the area, determine a distance of each MDU from each human, and then instruct the MDUs to perform a command (e.g., stop performing physical activities, reduce speed, move to a new location, etc.) based on each MDU's distance from the human. To illustrate, the human may wear a locator device that includes a reader device to scan identifiers, such as fiducial markers, placed at various locations within an area. To illustrate, the identifiers may be placed on the floor or at a certain height to enable the reader to automatically scan the identifiers and transmit the read information to the safety management device. In some cases, the information read from the identifiers may include location information associated with a corresponding location of each of the identifiers.

As another example, the humans may wear a locator device that includes a radio frequency identifier (RFID) reader to read RFID tags placed at various locations (e.g., on the floor, at a particular height, in fiducial markers, etc.) within an area. As yet another example, individual MDUs may detect the presence of a human by receiving a signal transmitted (e.g., broadcast) by a locator device that is worn by the human. To illustrate, each human may wear a locator device that transmits or broadcasts a signal, such as an RFID signal or other type of signal. In this example, the MDUs may detect the presence of humans by detecting the signal (e.g., RFID or similar signal) that is being transmitted or broadcast by the locator device worn by each human. As a further example, an indoor positioning system may be used to track the location of each human that enters an area in which one or more MDUs are performing activities. To illustrate, antennas placed at various locations in the area may be used to determine (e.g., using triangulation) a location of each locator device worn by each human. The locator device may transmit or broadcast using one or more frequencies to enable the location to be determined relatively quickly.

When a safety management device detects that a human has entered an area in which MDUs are performing activities, the safety management device may create a safe zone by instructing MDUs within a predetermined distance from the human to stop performing any physical activities. The safety management device may instruct MDUs that are more than the predetermined distance from the human to avoid entering the safe zone. As the human moves within the area, the safety management device may track the location of the human and the locations of the MDUs. Based on the distance of the MDUs from the human, the safety management device may instruct at least some of the MDUs to either (i) stop performing any physical activity and/or (ii) avoid a portion of the area (e.g., the safe zone).

When the safety management device instructs an MDU to cease performing physical activities, in some cases the instruction may cause the connection of a portion of the MDU to a power source to be interrupted. For example, the instruction to cease performing physical activities may cause the connection that provides power to the wheels (or other means of conveyance for the MDU) to be temporarily interrupted. As another example, the instruction to cease performing physical activities may cause the connection that provides power to the various electronic components of the MDU to be temporarily interrupted.

Thus, when the presence of a human is detected in or near (e.g., within a predetermined distance from) an area in which MDUs are performing activities, the MDUs may temporarily stop performing the activities. In some cases, the MDUs may perform another activity, such as navigating to a new location. For example, the MDUs may move to a location that is greater than a predetermined distance from the estimated path of the human and then temporarily stop performing any activity. The presence of the human may be detected by one or more MDUs and then transmitted or broadcast to other MDUs in the area and/or a management device. The presence of the human may be detected by a management device and transmitted or broadcast to at least one of the MDUs in the area. The presence of the human may be detected using one or more techniques, such as (1) sensors interspersed throughout the area, (2) imaging devices capable of capturing images of the area, (3) a device worn by the human that receives and/or sends location information, and/or (4) other means of detection.

Mobile Drive Units Instructed Based on a Distance from a Human

FIG. 1 is an illustrative architecture 100 that includes instructing mobile drive units within a first distance from a human to stop performing physical activities according to some implementations. The architecture 100 includes an area 102 with one or more fixed objects 104, such as the representative fixed objects 104(1), 104(2), 104(3) and 104 (4). The fixed objects may include, for example, items, a load of items, shelves to store items, pillars, machinery, tables, other objects that are not moved very often, or any combination thereof. The architecture 100 illustrates how the area 102 may be made functionally safe for humans.

The area 102 may include one or more mobile drive units (MDU) 106, such as the representative MDUs 106(1), 106(2), 106(3) and 106(4). One or more of the MDUs 106 may be airborne, e.g., capable of travelling through three dimensional space. Individual mobile drive units of the MDUs 106 may be instructed to perform a set of activities, such as placing items onto one or more of the fixed objects 104, selecting and removing one or more items from the fixed objects 104, moving between the fixed objects 104 to perform the set of activities, moving items from one of the fixed objects 104 to another of the fixed objects 104, etc.

An operational management device 108 may be used to control the operations or activities of the MDUs 106. For example, the operational management device 108 may instruct individual mobile drive units of the MDUs 106 to perform a particular set of activities. For example, the operational management device 108 may wirelessly transmit a first command (e.g., to perform a first set of activities) to the MDU 106(1), wirelessly transmit a second command (e.g., to perform a second set of activities) to the MDU 106(2), and so on.

A safety management device 110 may control the MDUs 106 to provide a functionally safe environment for humans in the area 102. For example, each of the MDUs 106 may periodically, at an interval of N milliseconds (where N>0), send a query message asking if each MDU can perform (or continue performing) the set of activities that the operational management device 108 has instructed the MDUs 106 to perform. Each query message may include (i) a unique identifier and (ii) an identity of the sending mobile drive unit. For example, a query message sent by MDU 106(1) may indicate that the query message was sent by MDU 106(1). In some cases, the query message may include a time stamp. For example, the unique identifier may include a time stamp that includes a date and time that the query message was sent along with an identity of the sending mobile drive unit. The safety management device 110 may respond to each query message that the safety management device 110 receives from the MDUs 106. For example, a response message to a query message may instruct a particular one of the MDUs 106 to (i) continue performing a set of activities, (ii) temporarily stop performing the set of activities, (iii) reduce a speed of the particular MDU when moving from one location to another location, (iv) move to a new location, (v) move to a new location and temporarily not perform any physical activities, and so on. Thus, a particular mobile drive unit of the MDUs 106 may perform (or continue performing) the set of activities when the particular mobile drive unit has a received a response to a most recently sent query message instructing the particular mobile drive unit to continue performing the set of activities. A particular mobile drive unit of the MDUs 106 may stop performing the set of activities when the particular mobile drive unit fails to receive a response to a most recently sent query message or when the particular mobile drive unit receives an instruction to stop performing any physical activity. In some cases, a particular mobile drive unit of the MDUs 106 may stop performing the set of activities when the particular mobile drive unit fails to receive more than M response messages (where M>0).

In some implementations, each of the MDUs 106 may periodically, at an interval of N milliseconds (where N>0), receive a message from the safety management device 110 without the MDUs 106 periodically sending query messages to the safety management device 110. For example, the safety management device 110 may periodically send an instructional message to each of the MDUs 106, instructing each of the MDUs 106 to (i) continue performing a set of activities, (ii) temporarily stop performing the set of activities, (iii) reduce a speed of the particular MDU when moving from one location to another location, (iv) move to a new location, or (v) move to a new location and temporarily not perform any physical activities. Thus, in such implementations, the safety management device 110 may send instructional messages rather than responses to query messages sent by the MDUs 106.

Various types of techniques may be used to track the location of each of the MDUs 106 and the location of humans, such as the human 118. One or more imaging devices 112 (e.g. cameras), such as representative imaging devices 112(1), 112(2), 112(3) and 112(4), may be placed at various locations in the area 102 to provide information used to track mobile drive units and humans. The cameras 112 may provide image data to enable the operational and safety management devices 108, 110 to track the movement and determine a location of each of the MDUs 106 and the humans in the area 102. One or more sensors 114, such as representative sensors 114(1), 114(2), 114(3) and 114(4), may be placed at various locations in the area 102 to provide sensor data to track the movement and determine a location of each of the MDUs 106 and the humans in the area 102. The sensors 114 may include motion sensors, heat sensors, infrared sensors, pressure sensors, another type of sensor, or any combination thereof.

Identifiers 116 (e.g., fiducial markers), such as representative identifiers 116(1), 116(2), 116(3) and 116(4), may be placed at various locations in the area 102. The identifiers 116 may be read by (i) a locator device worn by a human, such as a representative human 118, or (ii) a locator device mounted on each of the MDUs 106. In FIG. 1, a locator device 120 is illustrated as being worn by the human 118. The locator device 120 may include a reader device that is capable of reading the identifiers 116. For example, the identifiers 116 may include an optically scannable code, such as a bar code or quick reference (QR) code, that can be scanned by a code reader device. As another example, the identifiers 116 may broadcast an RFID signal that can be read by an RFID reader device. A locator device, such as the locator device 120, may scan, read, or receive signals from a particular identifier of the identifiers 116 when the locator device 102 is within a predetermined distance from the particular identifier and transmit at least a portion of the data scanned, read, or received from the particular identifier to at least one of the management devices 108, 110. Each of the identifiers 116 may provide data that enables the management devices 108, 110 to determine a location of the human 118 and/or a location of the MDUs 106. For example, each of the identifiers 116 may have a unique identifier and the management devices 108, 110 may be capable of mapping the unique identifier to a specific location in the area 102. In some cases, the data provided by scanning, reading, or receiving signals from one of the identifiers 116 may include a location of the identifier that is being scanned. For example, when the locator device 120 scans, reads, or receives signals from the identifier 116(2), the locator device 120 may receive data that includes a location of the identifier 116(2). The locator device 120 may send the data from the identifier 116(2) to the management devices 108, 110 to enable the management devices 108, 110 to determine that the human 118 is located near the location of the identifier 116(2).

The safety management device 110 may determine a location of each of the MDUs 106. In some cases, when a human is determined to be present in or near the area 102, the safety management device 110 may instruct all the MDUs 106 to temporarily stop performing any physical activities. If one or more of the MDUs 106 are airborne, the airborne MDUs may be instructed to land in a controlled manner and then stop performing any physical activities. In other cases, when humans are present in or near the area 102, the safety management device 110 may determine a location of each of the humans, such as a location of the human 118. When the safety management device 110 determines that a human is in (or near) the area 102, the safety management device 110 may determine a location of each of the MDUs 106 and instruct the MDUs 106 to perform a command, e.g., based on the distance of a particular MDU from the human 118. The commands to the MDUs 106 may include stop performing physical activities, change from a faster speed to a slower speed when moving from one location to another location, move to a new location, etc. For example, the safety management device 110 may determine that an MDU, such as the MDU 106(1), is within a first distance 122 from the human 118 and instruct the MDU to stop performing physical activities (e.g., to ensure the safety of the human 118). As another example, the safety management device 110 may determine that an MDU, such as the MDU 106(2), is within a second distance 124 (e.g., greater than the first distance 122) from the human 118 and instruct the MDU to change from a faster speed to a slower speed when moving from one location to another location. In this example, the safety management device 110 may determine that the MDU 106(2) is within the second distance 124 from the human 118, but will not travel within the first distance 122 from the human 118, and may thus instruct the MDU 106(2) to reduce speed, rather than stop all physical activities. Alternatively or additionally, the safety management device 110 may instruct the MDU 106(2) within the second distance 124 from the human 118 to navigate away from the location of the human 118 until the MDU 106(2) is outside the second distance 124 from the human, for example, and then continue performing a set of activities while maintaining at least the second distance 124 from the human, or stop all physical activities. The safety management device 110 may instruct MDUs within a remaining portion 126, e.g., outside the second distance 124 from the human 118, of the area 102, such as the MDU 106(3) and MDU 106(4), to each continue performing a set of activities. Alternatively or additionally, the safety management device 110 may instruct the MDUs 106(3) and 106(4) to navigate further away from the location of the human 118 and then continue performing a set of activities while maintaining a further specified distance from the human, or stop all physical activities. If one or more of the MDUs 106 are airborne, the airborne MDUs 106 may be instructed to land in a controlled manner. For example, the airborne MDUs 106 may be instructed to land in such a way that after landing, the previously airborne MDUs 106 are at least the first distance 122 from the human 118. To illustrate, the airborne MDUs 106 may be instructed to land in a controlled manner in a portion of the area 102 that is greater than the first distance 122 but may be less than the second distance 124. After landing, the previously airborne MDUs 106 may be instructed to stop performing all physical activities. In some cases, if the airborne MDUs 106 are within the first distance 122 from the human 118, the airborne MDUs 106 may be instructed to drop to the ground (e.g., by cutting power to the mechanism that is keeping the MDUs 106 airborne) or land in a controlled manner. Airborne MDUs 106 that are the second distance 124 (or greater) from the human 118 may be instructed to land in a controlled manner, navigate to a new location that is a greater that the second distance 124 from the human 118, stop performing any physical activities, or any combination thereof.

The safety management device 110 may effectively create a moveable zone 128 by tracking the movement of the human 118 in the area 102 in real-time and instructing the MDUs 106 accordingly. For example, if the human 118 moves towards the MDU 106(2), the safety management device 110 may determine that the MDU 106(2) is within the first distance 122 from the human 118 and instruct the MDU 106(2) to stop performing any physical activities. The safety management device 110 may determine that the MDU 106(3) is within the second distance 124 from the human 118 and instruct the MDU 106(3) to reduce speed. The safety management device 110 may continue tracking the movement of the human 118 in real-time and instructing the MDUs 106 accordingly until the safety management device 110 determines that the human 118 is no longer in the area 102.

For illustration purposes, the moveable zone 128 is shown as being circular in FIG. 1. However, it should be understood that the moveable zone 128 may take the form of any geometric shape (e.g., square, rectangle, triangle, or the like) or any non-geometric shape. In addition, while the first distance 122 and the second distance 124 are illustrated in FIG. 1, the number of distances and the instructions provided to the MDUs based on the distance may vary. For example, in some implementations, MDUs within the first distance 122 may be instructed to stop performing any physical activity while MDUs that are greater than the first distance 122 from the human 118 may be instructed to continue performing a set of activities.

The safety management device 110 may include a redundant architecture such that the safety management device 110 can continue to function by instructing the MDUs 106 even after the failure of a hardware component or a software component. For example, when a hardware component fails, the safety management device 110 may detect the failure and switch to using a backup hardware component.

In some implementations, the function of the management devices 108, 110 may be distributed among the MDUs 106. For example, a mobile drive unit (e.g., MDU 106(1)) that is closest to the human 118 may detect the presence of the human 118, and send instructions to the other MDUs 106 (e.g., MDU 106(2), MDU 106(3), and MDU 106(4)) to perform various actions, such as reducing speed or navigating to a new location.

When the safety management device 110 or one (or more) of the MDUs 106 determines that the human 118 has exited (e.g., is no longer present in) the area 102, individual drive units of the MDUs 106 may resume performing a set of activities. In some cases, at least some of the MDUs 106 may resume the activities that were being performed before the presence of the human 118 was detected in the area 102. In other cases, at least some of the MDUs 106 may perform a different set of activities as compared to the set of activities that were being performed before the presence of the human 118 was detected in the area 102.

Thus, when the presence of a human is detected in an area, a safety management device may continually monitor in real-time a location of the human, a location of individual mobile drive units, and/or a distance of the mobile drive units from the human. In some implementations, based on the distance of the individual mobile drive units from the human, the safety management device may continually send updated instructions to the mobile drive units.

Creating a Moveable Zone

Figure 2:
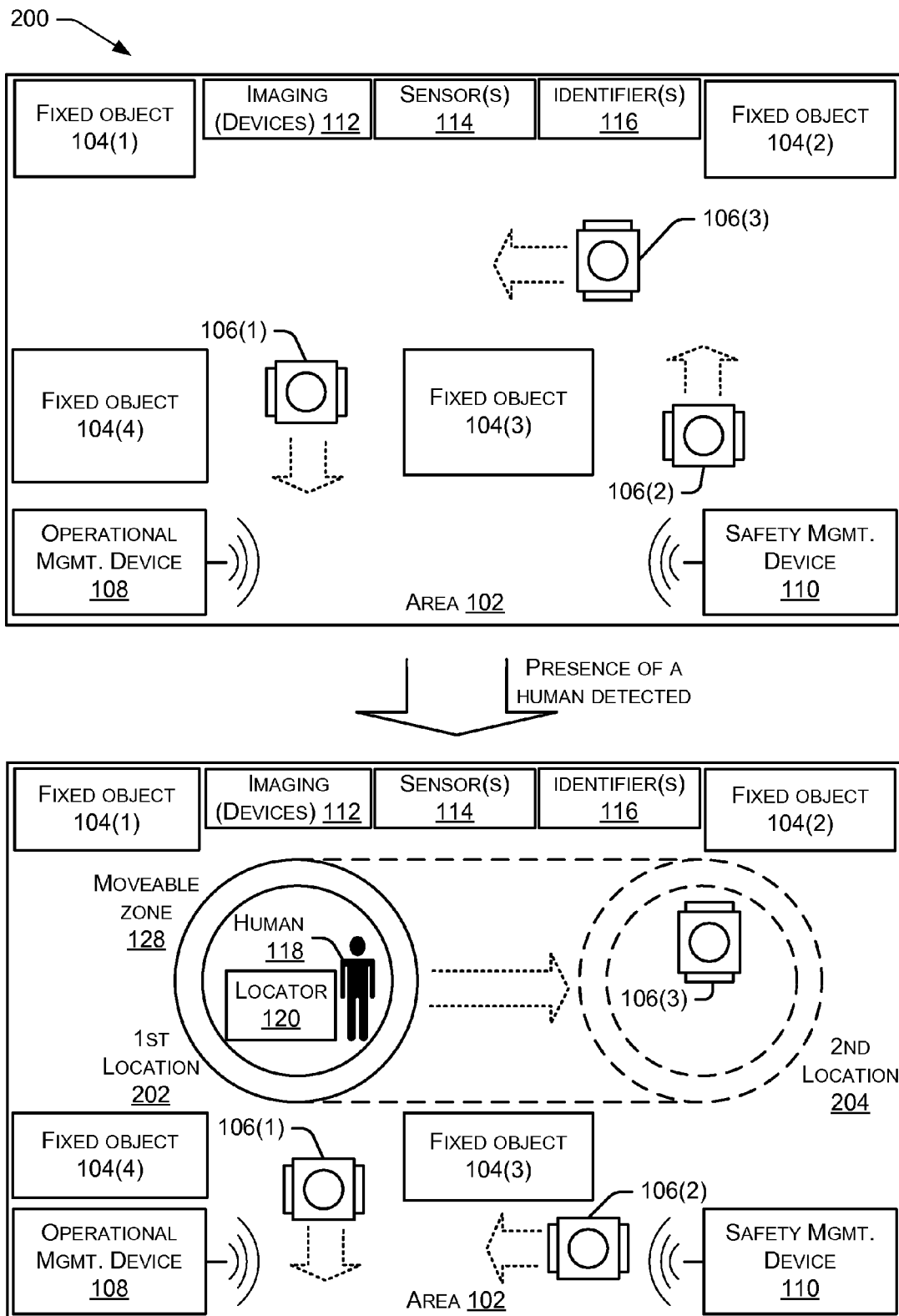
FIG. 2 is an illustrative architecture that includes a moveable zone according to some implementations.

FIG. 2 is an illustrative architecture 200 that includes a moveable zone according to some implementations. Initially, before a human is detected, the MDUs 106 may perform activities as directed by the operational management device 108, and as confirmed by the safety management device 110, free of any special restrictions or safety considerations, as shown in the upper panel of FIG. 2. Suppose, however, that the human 118 enters the area 102, as shown in the lower panel of FIG. 2. When the presence of the human 118 is detected, e.g., via locator device 120, at a first location 202 in the area 102, the safety management device 110 may create the moveable zone 128 around the human 118 to create a functionally safe environment. For example, based on a distance of each of the MDUs 106 from the human 118, the safety management device 110 may instruct individual mobile drive units of the MDUs 106 to (i)

continue performing a set of activities, (ii) temporarily stop performing the set of activities, (iii) reduce speed when moving from one location to another location, (iv) move to a new location, or (v) move to a new location and temporarily stop performing physical activities. To illustrate, some of the MDUs 106 that are within a first distance from the human 118 may be instructed to perform a first command (e.g., temporarily stop performing any physical activities), while others of the MDUs 106 that are at greater than the first distance but within a second distance from the human 118 may be instructed to perform a second command (e.g., temporarily reduce speed when moving from one location to another location).

The safety management device 110 may continually monitor the location of the human 118 within the area 102, continually monitor the location of each of the MDUs 106 within the area 102, and instruct individual ones of the MDUs 106 to perform a command based on the distance of the MDUs 106 from the human 118. For example, when the human 118 moves from the first location 202 to a second location 204 in the area 102, the safety management device 110 may determine that the MDU 106(3) is within the first distance 122 from the human 118 at the second location 204 and instruct the MDU 106(3) to temporarily stop performing any physical activities.

In some cases, at least one of the MDUs 106 may detect the presence of the human 118 in the area 102 and alert the safety management device 110, the other MDUs 106, or both as to the presence of the human 118. When a particular MDU of the MDUs 106 detects the presence of the human 118, the particular MDU may determine a distance between the particular MDU and the human 118 and automatically perform an action, such as temporarily stopping all physical activities.

When the management device 108 and/or at least one (or all) of the MDUs 106 determines that the human 118 is no longer present in the area 102, individual drive units of the MDUs 106 may resume performing a set of activities. In some cases, at least some of the MDUs 106 may resume the activities that were being performed before the presence of the human 118 was detected in the area 102. In other cases, at least some of the MDUs 106 may perform a different set of activities as compared to the set of activities that were being performed before the presence of the human 118 was detected in the area 102.

The presence or absence of the human 118 in the area 102 may be determined using the locator device 120, the imaging devices 112, the sensors 114, the identifiers 116, the MDUs 106, using another technique, or any combination thereof.

Thus, when the presence of a human is detected in an area in which MDUs are performing a set of activities, the MDUs may temporarily stop performing the set of activities. When a determination is made that the human is no longer present in the area, the MDUs may resume performing the set of activities. In this way, the MDUs may provide a functionally safe environment to prevent the human from being inadvertently injured by the MDUs.

Creating a Fixed Zone

Figure 3:
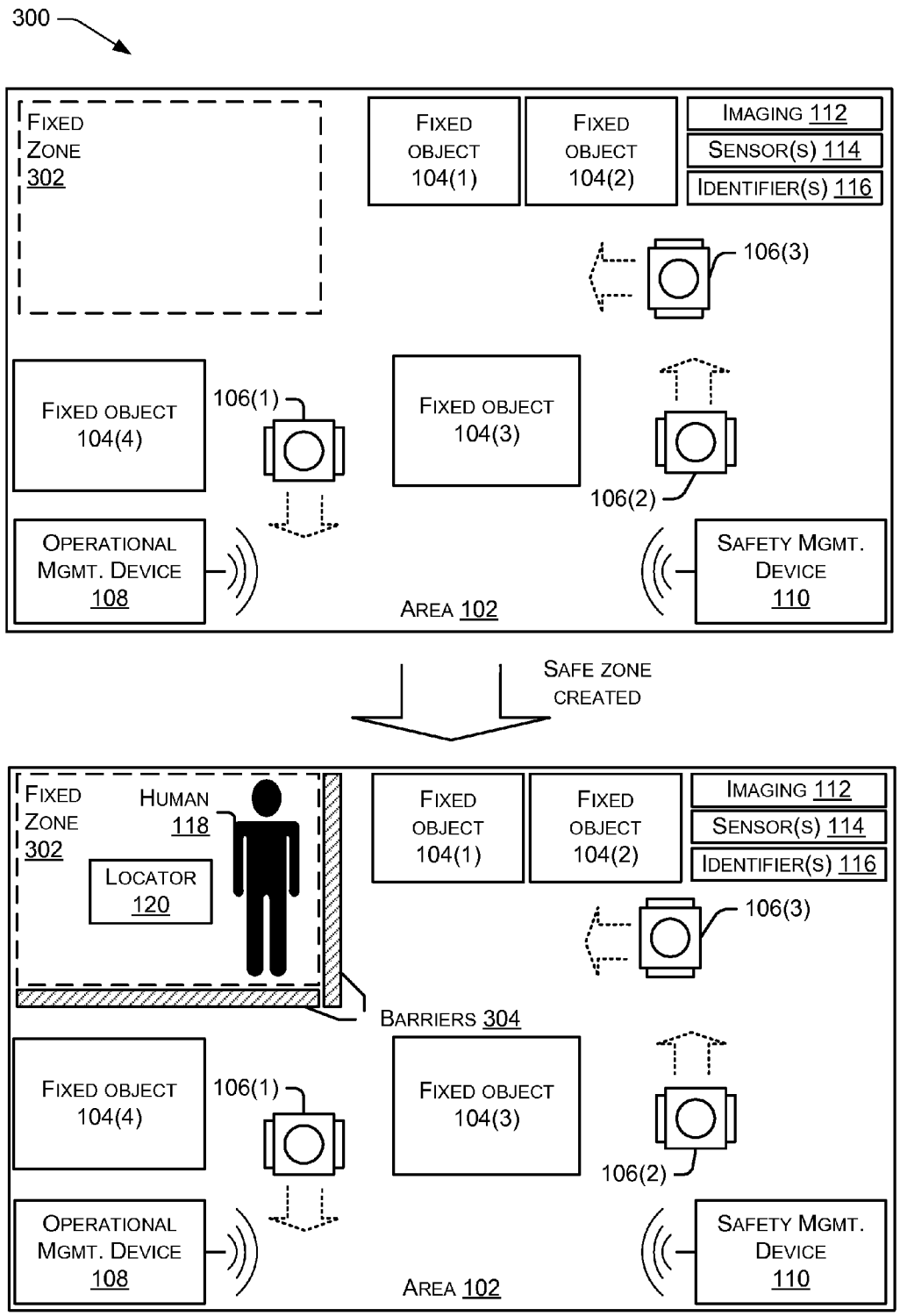
FIG. 3 is an illustrative architecture that includes a fixed zone according to some implementations.

FIG. 3 is an illustrative architecture 300 that includes a fixed zone according to some implementations. In some situations, the human 118 may perform activities in a portion of the area 102 but not outside the portion. For example, the human 118 may perform repairs to a piece of equipment in the area 102, perform repairs to one of the MDUs 106, add or adjust shelves to one of the fixed objects 104, etc. In such situations, the human 118 may use a relatively fixed portion of the area 102, e.g., a work area.

To create such an area, the human 118 may instruct the safety management device 110 to create a fixed zone 302. For example, the human 118 may specify a location and a size of the fixed zone 302. The fixed zone 302 may be created using barriers 304. The barriers 304 may include virtual barriers, physical barriers, or both.

To create the fixed zone 302 using virtual barriers 304, the safety management device 110 may instruct the MDUs 106 to avoid entering a portion of the area 102 that includes the fixed zone 302. In some cases, the safety management device 110 may instruct one or more of the MDUs 106 to place transmitters (e.g., light curtains or similar devices) along a perimeter of the fixed zone 302. Alternatively, the human 118 may place transmitters along a perimeter of the fixed zone 302. The transmitters may broadcast a signal that causes the MDUs 106 to avoid entering a portion of the area 102 that includes the fixed zone 302.

To create the fixed zone 302 using physical barriers, the safety management device 110 may instruct the MDUs 106 to place the (physical) barriers 304 to mark the boundary of the safe zone 302. Alternatively, the human 118 may place transmitters along a perimeter of the fixed zone 302. The MDUs 106 may each include one or more sensors that are capable of identifying the (physical) barriers 304. For example, the MDUs 106 may sense the (physical) barriers 304 as walls (or other fixed objects) that are to be avoided when navigating the area 102. In some implementations, the physical barriers 304 may include transmitters that transmit a signal that instructs the MDUs 106 to avoid a portion of the area 102 that includes the fixed zone 302. In such an implementation, the barriers 304 may include both physical barriers and virtual barriers. If the virtual barrier fails (e.g., a particular MDU attempts to enter the fixed zone 302 because a transmitter failed or because the particular MDU's sensor failed), the physical barrier may prevent the particular MDU from entering the fixed zone 302.

During the time that the fixed zone 302 is created, the MDUs 106 may avoid coming within a specified (e.g., predetermined) distance of the fixed zone 302. When the safety management device 110 determines that the human 118 is no longer present in the area 102, the safety management device 110 may instruct the MDUs 106 to resume performing a set of activities, including activities that involve entering the portion of the area 102 that was used to create the fixed zone 302. If physical barriers were used to create the fixed zone 302, after the human has left the area 102, the safety management device 110 may instruct the MDUs 106 to remove the physical barriers. Alternatively, the human 118 may remove the physical barriers from the fixed zone 302.

In some cases, as a further safety measure, individual ones of the MDUs 106 that come within a predetermined distance of the fixed zone 302 (or the barriers 304) may perform an action, e.g., similar to the moveable zone 128 of FIG. 1. For example, individual ones of the MDUs 106 that come within a first predetermined distance from the fixed zone 302 (or the barriers 304) may stop performing physical activities while individual ones of the MDUs 106 that are within a second predetermined distance may reduce speed.

Thus, a fixed zone that is functionally safe may be created to enable a human to perform actions without risking injury by an MDU. The fixed zone may be created using physical barriers, virtual barriers, or a combination of both.

Configurable Zones

Figure 4:
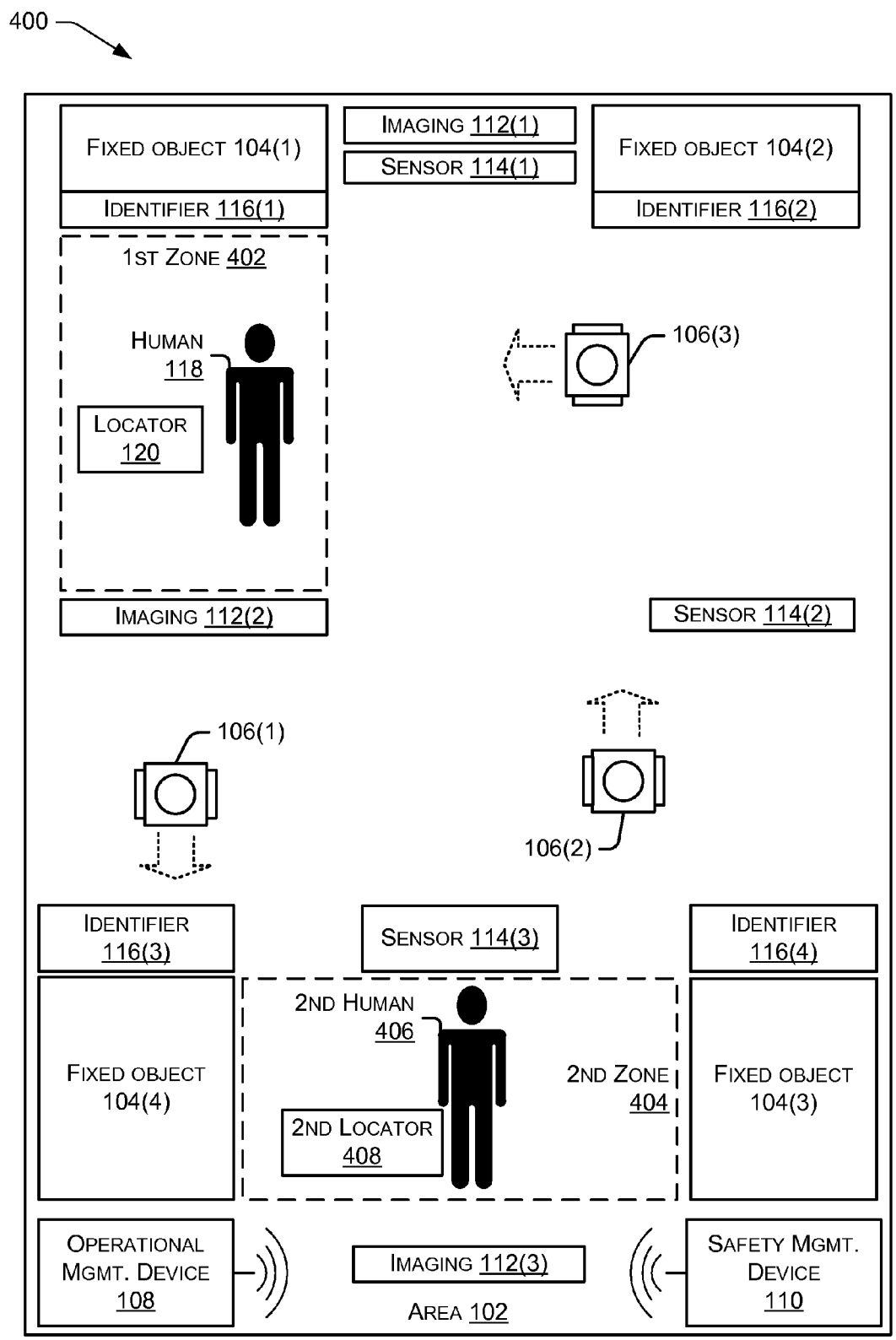
FIG. 4 is an illustrative architecture that includes multiple configurable zones according to some implementations.

FIG. 4 is an illustrative architecture 400 that includes multiple configurable zones according to some implementations. As discussed above with respect to FIGS. 1, 2, and 3, various types of zones, including moveable zones and fixed zones, may be created when the human 118 is present in the area 102.

The architecture 400 illustrates how an area, such as the area 102, may include multiple zones in which each zone can be configured or reconfigured as desired to be one of the zones described in FIG. 1, 2, or 3. In FIG. 4, the area 102 includes a first zone 402 and a second zone 404. Of course, depending on the implementation, an area may have more or fewer than two zones.

Each of the zones 402 and 404 may be configurable and the behavior of the MDUs 106 that are present may depend on various factors, including a setting of the locator device 120, a current time and/or date, other factors, or any combination thereof. For example, when the presence of the human 118 is detected in the first zone 402, the MDUs 106 may slow down or stop performing physical activities (e.g., as illustrated in FIGS. 1 and 2). As another example, the second zone 404 may be a fixed zone (e.g., as illustrated in FIG. 3) during a particular time period on a particular day of the week. For example, the second zone 404 may be a safe zone every Friday between 2:00 and 4:00 PM, to enable maintenance to be performed. During other times, the second zone 404 may be a moveable zone that surrounds a second human 406 when the second human 406 is detected in the area 102. The second human 406 may wear a second locator device 408 to enable the safety management device 110 to track the location of the second human 406.

In some cases, the locator devices 120, 408 may include settings that specify the behavior of the MDUs 106. For example, a first setting may cause MDUs 106 within a predetermined distance from the humans 118, 406 to perform a first command (e.g., stop performing physical activities). A second setting may cause MDUs 106 within a first distance from the humans 118, 406 to perform a first command (e.g., stop performing physical activities) and may cause MDUs 106 within a second distance to perform a second command (e.g., reduce speed when moving to a new location).

Thus, an area may include more than one zone and the behavior of MDUs in each zone may be configurable depending on various factors. For example, the human may wear a locator device that has different settings that determine the behavior of the MDUs when the human's presence (e.g., the locator device's presence) is detected. In this way, humans can specify the behavior of the MDUs in each zone. Other factors, such as time of day, a particular zone that the human has entered, and the like may also be used by the safety management device 110 to determine the behavior of the MDUs. In this way, the MDUs may comply with safety regulations to provide a functionally safe environment for humans.

Illustrative Architectures

Figure 5:
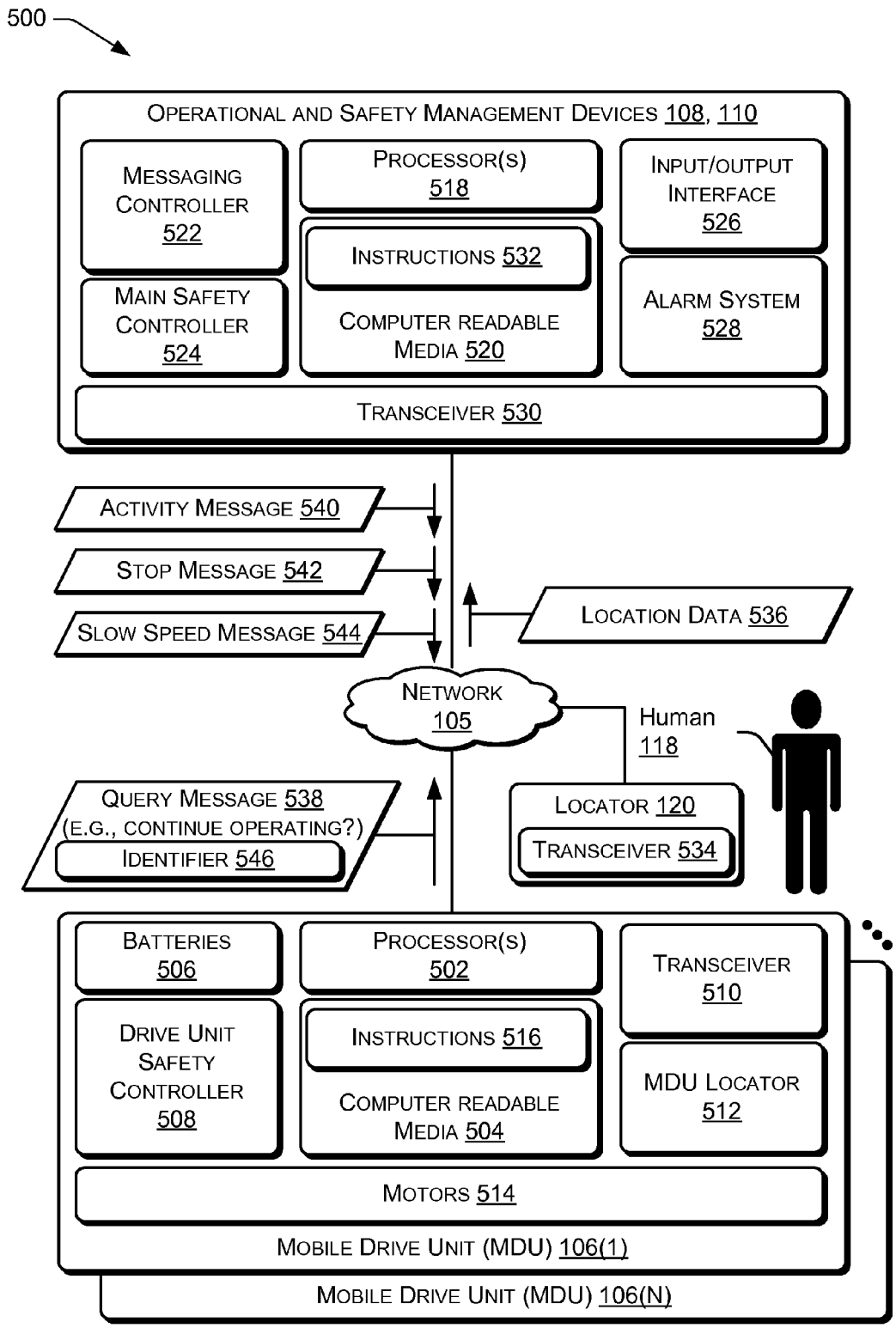
FIG. 5 is an illustrative architecture in which an activity message is delivered to mobile drive units at a predetermined interval according to some implementations.

FIG. 5 is an illustrative architecture 500 in which a message is delivered to mobile drive units at a predetermined interval according to some implementations. The architecture 500 may include mobile drive units 106(1) through 106(N) (where N>1) that are communicatively coupled to the safety management device 110 via a network 105. The network 105 may include one or more networks, including a wired network, a wireless network, or both. The network 105 may include technologies such as Ethernet, Data Over Cable Service Interface Specification (DOCSIS), Fiber Optic cable, WiFi® (e.g., 802.11), Bluetooth®, Global System for Mobile (GSM), Long Term Evolution (LTE), Universal Mobile Telephone Service (UMTS), Code Division Multiple Access (CDMA), another type of network technology, or any combination thereof.

Each mobile drive unit 106 may include one or more processors 502, one or more memory devices (e.g., computer readable media 504), one or more batteries (or other power sources) 506, a drive unit safety controller 508, a transceiver 510, an MDU locator 512, one or more drive mechanisms, such as motors 514, or any combination thereof. The computer readable media 504 may include non-transitory media to store instructions 516 that are executable by the processors 502 to perform the various functions of the MDU 106. The drive unit safety controller 508 may govern the behavior of the MDU 106 to prevent the MDU 106 from causing injury to the human 118. The transceiver 510 may be capable of transmitting and receiving messages using the network 105. The MDU locator 512 may be used to transmit a location of each MDU 106(1) through 106(N) to the management devices 108, 110 using the transceiver 510.

The operational and safety management devices 108, 110 may include one or more processors 518, one or more memory devices, such as computer readable media 520, a messaging controller 522, a main safety controller 524, an input/output interface 526, an alarm system 528, a transceiver 530, or any combination thereof. The computer readable media 520 may include instructions 532 that are executable by the processors 518 to perform the various functions of the safety management device 110. The messaging controller 522 may determine which particular messages are to be sent to particular MDUs 106. The main safety controller 524 may provide various safety instructions including determining when to instruct the MDU's 106 to stop performing any physical activity, when to reduce speed, when to navigate away from a human, etc. The input/output interface 526 may include various input and output devices, such as a keyboard a mouse, a trackball, a display device, other input/output devices, and the like. The alarm system 528 may cause an alarm to sound or be displayed in an area, such as the area 102, to alert human(s) that are in the area to exit the area etc. The transceiver 530 may be used to send messages to and receive messages from the MDUs 106.

The human 118 may be associated with (e.g., by wearing) the locator device 120. For example, the locator device 120 may be incorporated into an identification badge, a hard hat, safety glasses, work boots, protective suit, or any other item that can be worn or carried by the human 118. The locator device 120 may include a transceiver 534 to send messages to or receive messages from the operational and safety management devices 108, 110, the MDUs 106, or both. For example, the transceiver 534 may send a message that includes location data 536 to enable the management devices 108, 110, the MDUs 106, or both to determine a location of the human 118.

In some implementations, each of the MDUs 106 may send, at a predetermined interval (e.g., every M milliseconds, where M>0) a query message 538 (e.g., "continue operating?") to the safety management device 110. In response to receiving the query message 538, the safety management device 110 may send a response message to individual ones of the MDUs 106. For example, when the safety management device 110 determines that no human is present, the response message may be an activity message 540 that instructs an MDU to continue performing a set of activities. When the safety management device 110 determines that a human is present, the response message may be a stop message 542 that instructs an MDU to temporarily (e.g., while the human 118 is present) stop performing any physical activities, or the response message may be a slow speed message 544 that instructs an MDU to temporarily (e.g., while the human 118 is present) reduce a speed of the MDU when navigating to a new location. Other response messages when a human is present are also possible, e.g., a response message that instructs an MDU to navigate away from the human 118, or combinations of the various response messages when a human is present.

The query message 538 may include an identifier 546 that uniquely identifies each query message that the safety management device 110 receives from each MDU. For example, the identifier 546 may include an identity of the MDU 106 that is sending the query message 538 and a timestamp that includes a date and time that the query message 538 was created. If the query message 538 includes the identifier 546, the response message (e.g., one of the messages 540, 542, or 544) sent by the safety management device 110 may include the identifier 546 to identify the response message as corresponding to a particular query message. If a particular MDU of the MDUs 106 fails to receive a response message that includes the identifier 546 of a most recently sent query message, the particular MDU may stop performing any physical activities until a response message including the identifier 546 is received, and/or one of the management devices 108, 110 instructs the particular MDU otherwise.

In other implementations, the MDUs 106 may not send the query message 538. When no human is detected, the safety management device 110 may periodically broadcast (e.g., send) the activity message 540 to the MDUs 106 to instruct each of the MDUs 106 to perform (or continue performing) a set of activities. In response to detecting the presence of the human 118, the safety management device 110 may stop sending the activity message 540 to the MDUs 106 and/or instead periodically broadcast the stop message 542, the slow speed message 544 or other appropriate messages when a human is present. After determining that the human 118 has left the area in which the MDUs 106 were performing activities, the safety management device 110 may resume broadcasting the activity message 540 to the MDUs 106 to instruct the MDUs 106 to resume performing the set of activities and/or perform a different set of activities.

As previously mentioned, if one of the MDUs 106, such as MDU 106(1), fails to receive the activity message 540, the MDU 106(1) may cease performing any physical activity until the MDU 106(1) receives the activity message 540. For example, in situations where the network 105 malfunctions, the MDUs 106 move to a location where commands from the operational management device 108 and/or the safety management device 110 cannot be received, or other situations where the MDUs 106 do not receive the activity message 540, the MDUs 106 may cease performing any physical activity until the activity message 540 is received, and/or until instructed otherwise. Thus, the activity message 540 may serve as a "heartbeat" such that if the MDUs 106 do not detect the heartbeat (e.g., receive the activity message 540), then the MDUs 106 may perform a default action, such as ceasing to perform any physical activity. The MDUs 106 may resume performing a set of actions when the MDUs 106 resume periodically receiving the activity message 540.

Thus, the MDUs 106 may perform a set of activities in an area (or zone) when they periodically receive the activity message 540 from the safety management device 110 instructing them to perform the set of activities. If the safety management device 110 detects the human 118 in the area (or zone), the safety management device 110 may determine a distance of each of the MDUs 106 from the human 118 and send the stop message 542 or the slow speed message 544 (or other messages) to each of the MDUs 106, e.g., based on the distance. The MDUs 106 may cease performing any physical activity if the MDUs 106 do not periodically receive the activity message 540.

Figure 6:
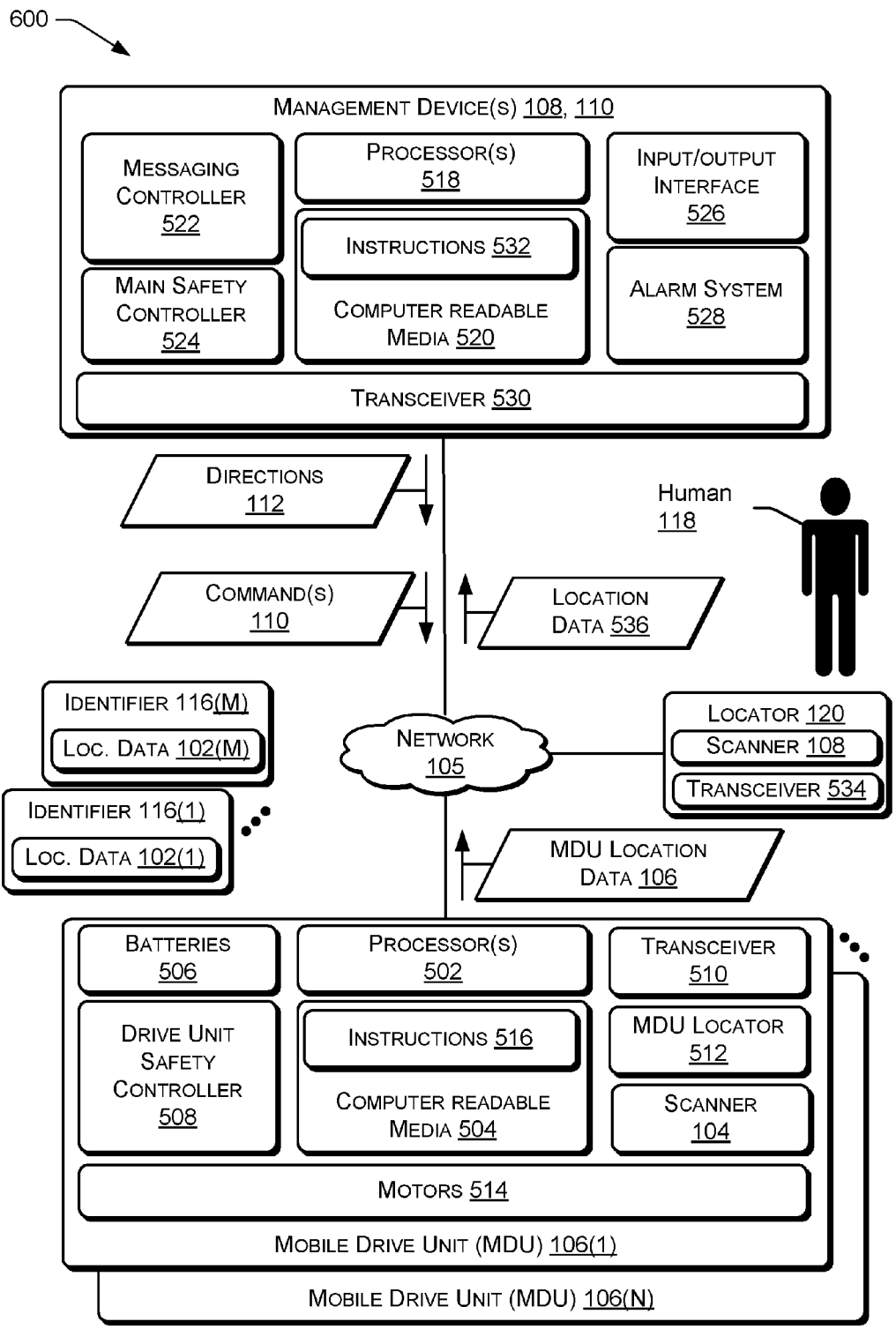
FIG. 6 is an illustrative architecture that includes using identifiers to determine location information according to some implementations.

FIG. 6 is an illustrative architecture 600 that includes using identifiers (e.g., fiducial markers) to determine location information according to some implementations. In some implementations, identifiers (e.g., fiducial markers), such as the identifiers 116 may be used to determine a location of one or more of the MDUs 106, the human 118, or both. For example, the identifiers 116(1) to 116(M) (where M>1) may be placed at various locations in an area (e.g., the area 102 of FIGS. 1-4). Each of the identifiers 116 may include corresponding location data 602(1) to 602(M). The identifiers 116 may comprise a physical code (e.g., a bar code, a quick response (QR) code, or other type of scannable code) that can be read using an imaging device, such as an optical scanner. Alternatively, the identifiers 116 may be broadcast (e.g., transmitted). For example, the identifiers 116 may include radio frequency identifier (RFIDs), or the like that transmit information stored thereon. In some cases, the identifiers 116 may include location information, such as the location data 602, that identifies a location corresponding to each of the identifiers 116.

Each of the MDUs 106(1) through 106(N) may include an imaging device, such as a scanner 604, that is capable of scanning (e.g., reading) the identifiers 602. Each time a particular one of the MDUs 106 passes by or over one of the identifiers 116, the scanner 604 may scan one of the identifiers 602 and send MDU location data 606 to the management devices 108, 110. For example, the MDU location data 606 may include a unique identifier provided by each of the identifiers 602. The management devices 108, 110 may determine a location of each of the MDUs 106 after receiving the MDU location data 606. For example, MDU 106(1) may send the MDU location data 606 that includes the identifier 602(1) associated with the identifier 116(1). The management devices 108, 110 may receive the MDU location data 606, determine that the identifier 602(1) is associated with the identifier 116(1), and determine a location of the identifier 116(1) to determine the location of the MDU 106(1).

Each human, such as the human 118, in an area (e.g., the area 102) may wear the locator device 120 that includes an imaging device, such as a scanner 608, that is capable of scanning (e.g., reading) the identifiers 602. Each time the human 118 passes near one of the identifiers 116, the scanner 608 may scan one of the identifiers 602 and send the location data 536 to the management devices 108, 110. For example, the location data 536 may include a unique identifier provided by one of the identifiers 602. The management device 108 may determine a location of the human 118 after receiving the location data 536. For example, the human 118 may send the location data 536 that includes the identifier 602(1) associated with the identifier 116(1). The management devices 108, 110 may receive the location data 536, determine that the identifier 602(1) is associated with the identifier 116(1), and determine a location of the identifier 116(1) to determine the location of the human 118.

The scanners 604, 608 (e.g., imaging devices) may be designed to scan each of the identifiers 602 of the identifiers 116. For example, when the identifiers 602 are optically scannable or readable, the scanners 604, 608 may be cameras or another type of imaging device. When the identifiers 602 are RFID tags, the scanners 604, 608, may be RF scanners (e.g., RFID readers).

Thus, identifiers, such as fiducial markers, where each fiducial marker has a unique corresponding identifier, may be used to determine a location of the MDUs 106, the human 118, or both. The location data 536 may enable the management devices 108, 110 to determine when the human 118 is in or near an area 102 in which the MDUs 106 are performing a set of activities. In response to determining that the human 118 is in or near the area 102, the management devices 108, 110 may send one or more commands 610 instructing the MDUs 106 to temporarily cease performing the set of activities. The one or more commands 610 may instruct the MDUs 106 to move to a new location, cease performing any activity, navigate away from the human, or any combination thereof. In response to detecting that the human 118 is no longer in or near the area (e.g., at least a predetermined distance from the area), the management devices 108, 110 may send additional commands instructing the MDUs 106 to resume performing the set of activities and/or perform a different set of activities.

In some situations, the management devices 108, 110 may send directions 612 to the human 118. For example, the human 118 may be unfamiliar with the layout of an area and the management devices 108, 110 may send the directions 612 to enable the human 118 to reach a particular location (e.g., a safe zone), to avoid a zone in which MDUs are performing activities, to exit an area to enable the MDUs to resume performing activities, etc. The directions 612 may include text messages to be displayed on a mobile communication device or on the locator device 120 associated with the human 118. The directions 612 may include multimedia (e.g., audio, video, or both) files to be played back on a mobile communication device or on the locator device 120 associated with the human 118.

Figure 7:
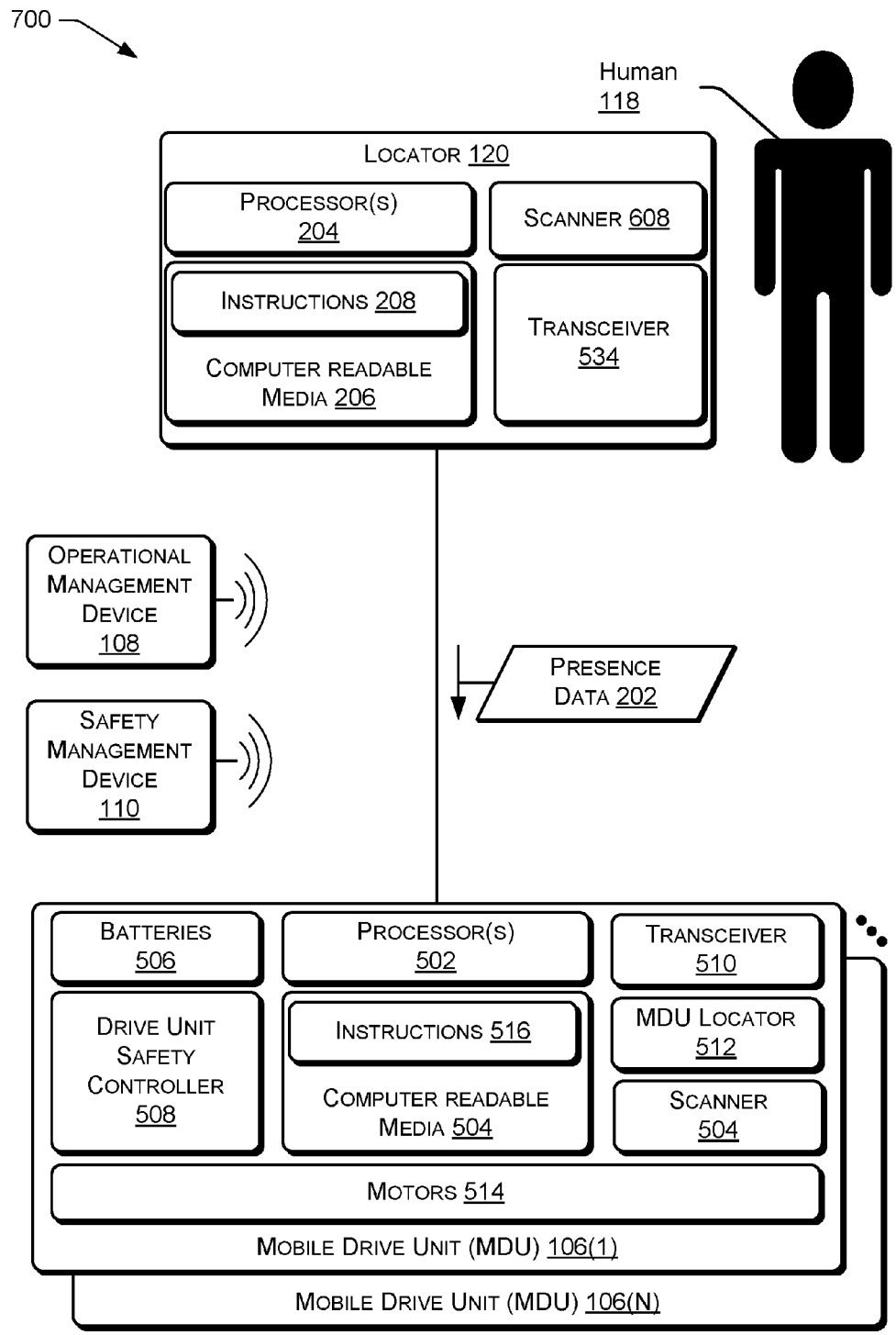
FIG. 7 is an illustrative architecture in which a mobile drive unit detects the presence of a human according to some implementations.

FIG. 7 is an illustrative architecture 700 in which a mobile drive unit may determine the presence of a human using presence data according to some implementations. In some implementations, MDUs may be capable of detecting the presence of humans in addition to or instead of the management devices 108, 110. For example, the MDU 106(1) may detect the human 118 based on presence data 702 sent by the locator device 120 and received by the transceiver 510.

The locator device 120 may include one or more processors 704 (or another type of logic execution mechanism) and one or more memory devices, such as computer readable media 706, to store instructions 708 that are executable by the one or more processors 704 (or logic) to perform the functions of the locator device 120. The locator device 120 may periodically send (e.g., broadcast) the presence data 702.

In some cases, in response to detecting the presence data 702, one or more of the MDUs 106 may notify the management device 108 that a human is present while in other cases one of the MDUs 106 may notify other MDUs 106 that a human is present. For example, the MDU 106(1) may receive the presence data 702 and determine that the human 118 is in or near an area in which the MDUs 106 are performing a set of activities. In response, the MDU 106(1) may (i) send a message to the management device 108 indicating that the human 118 is in or near the area, (ii) send a message to the other MDUs 106 (e.g., MDU 106(2) to MDU 106(N)) indicating that the human 118 is in or near the area, or both. In response to receiving the message from the MDU 106(1) indicating that the human 118 is in or near the area, the management device 108 may send a message to the other MDUs 106 (e.g., MDU 106(2) to MDU 106(N)) indicating that the human 118 is in or near the area.

Thus, an MDU may detect the presence of a human using presence data broadcast by a locator device that is worn by the human. The MDU may notify other MDUs of the presence of the human and/or the MDU may notify a management device and the management device may notify the other MDUs that the human is present in the area. In response to being notified of the presence of the human in the area, the MDUs may temporarily cease performing a set of activities, move to a new location, cease performing any activity, reduce speed, navigate away from the human, or any combination thereof. The MDUs may resume performing the set of activities (or perform a different set of activities) after receiving a message from a particular management device that the human is no longer in the area (e.g., the human is at least a predetermined distance from the area).

Example Processes

Figure 8:
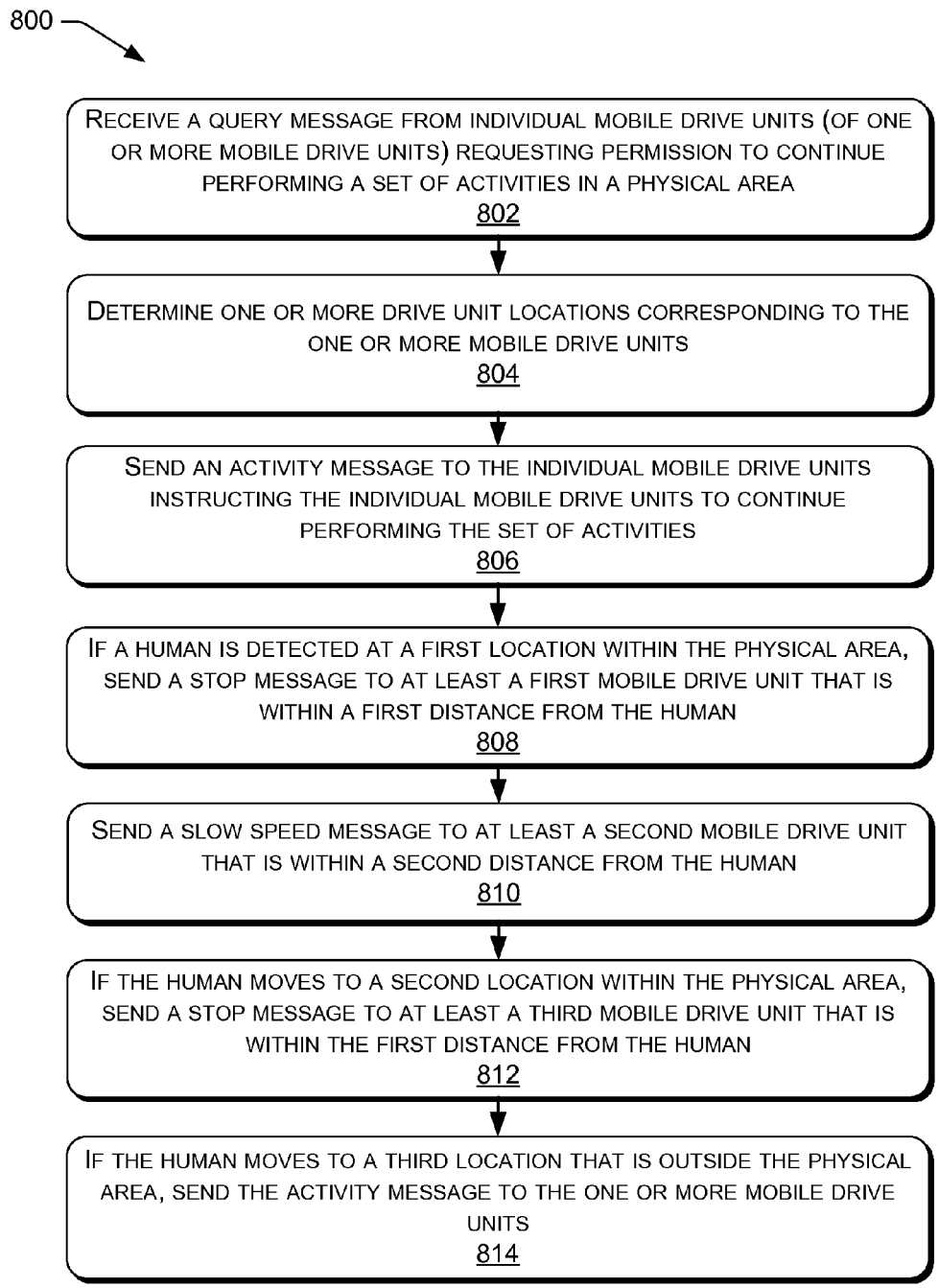
FIG. 8 is a flow diagram of an example process that includes sending an activity message according to some implementations.
Figure 9:
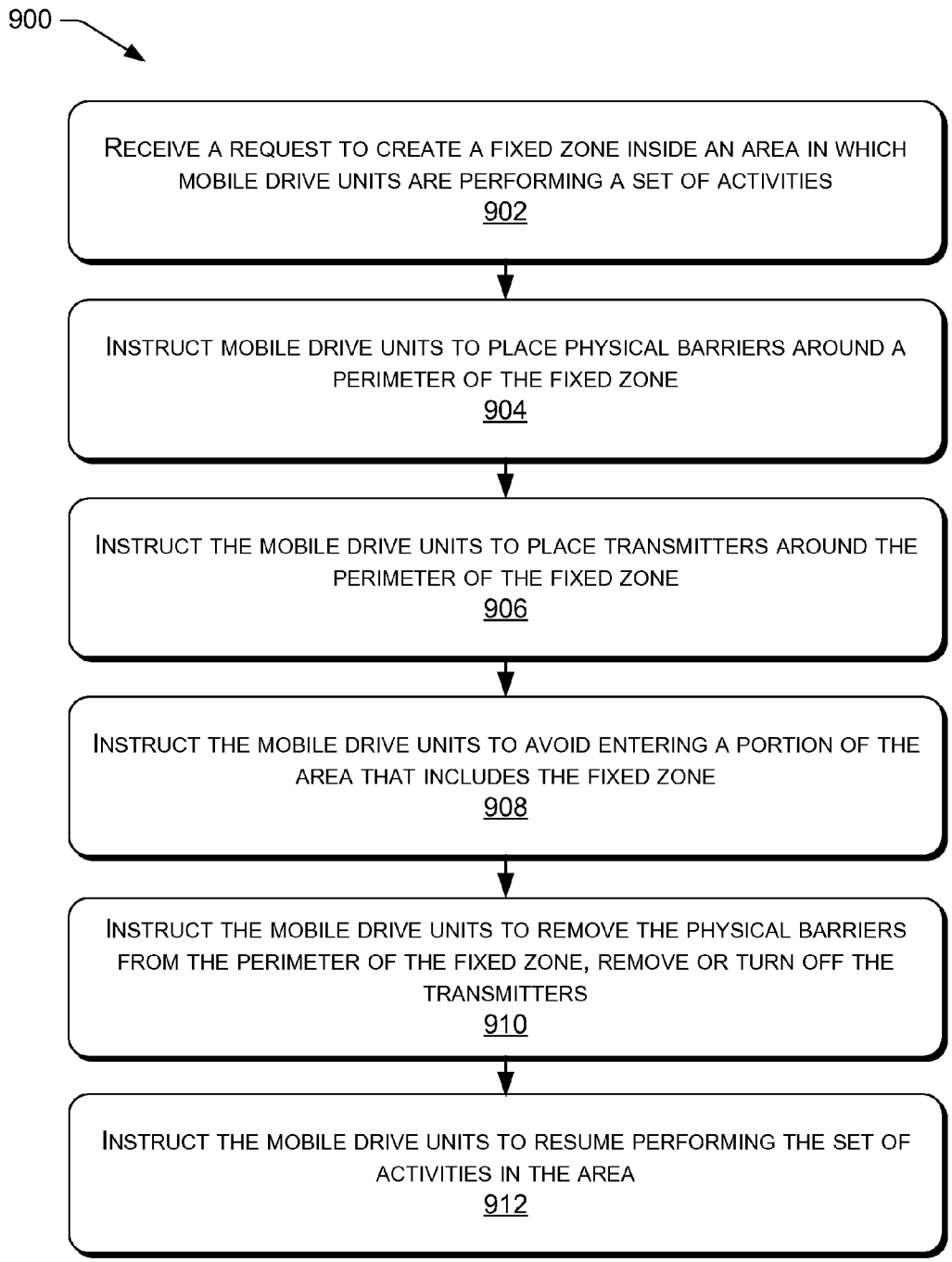
FIG. 9 is a flow diagram of an example process that includes instructing mobile drive units to avoid a portion of an area according to some implementations.

In the flow diagrams of FIGS. 8 and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800 and 900 are described with reference to the architectures 100, 200, 300, 400, 500, 600, and 700 as described above, although other models, frameworks, systems and environments may implement these processes.

FIG. 8 is a flow diagram of an example process 800 that includes sending an activity message according to some implementations. For example, the process 800 may be performed by the safety management device 110.

At 802, a query message may be received from individual mobile drive units (of one or more mobile drive units) requesting permission to continue performing a set of activities in a physical area. For example, in FIG. 5, the safety management device 110 may periodically receive the query message 538 from individual mobile drive units of the MDUs 106 that are performing activities in an area (e.g., the area 102 of FIG. 1).

At 804, one or more drive unit locations corresponding to one or more mobile drive units may be determined. For example, in FIG. 5, the safety management device 110 may determine a location corresponding to each of the MDUs 106(1) to 106(N).

At 806, an activity message may be sent to the individual mobile drive units instructing the individual mobile drive units to continue performing the set of activities. For example, in FIG. 5, the safety management device 110 may send an activity message 540 to each of the MDUs 106(1) to 106(N). The activity message 540 may include the identifier 546 to indicate that the activity message 540 is being sent in response to receiving the query message 538.

At 808, if a human is detected at a first location within the physical area, a stop message is sent to at least a first mobile drive unit that is within a first distance from the human. For example, in FIG. 1, the safety management device 110 may determine that the MDU 106(1) is within the first distance 122 from the human 118 and send a stop message (e.g., the stop message 542 of FIG. 5) instructing the MDU 106(1) to stop performing any physical activities.

At 810, a slow speed message may be sent to at least a second mobile drive unit that is within a second distance from the human. For example, in FIG. 1, the safety management device 110 may determine that the MDU 106(2) is greater than the first distance 122 from the human 118 but within the second distance 124 from the human 118 and send a slow speed message (e.g., the slow speed message 544 of FIG. 5) instructing the MDU 106(2) to reduce speed.

At 812, if the human moves to a second location within the physical area, a stop message is sent to at least a third mobile drive unit that is within the first distance from the human. For example, in FIG. 2, when the human 118 moves to the second location 204, the safety management device 110 may send a stop message (e.g., the stop message 542 of FIG. 5) to the MDU 106(3) if the MDU 106(3) is within the first distance 122 from the human 118 at the second location 204.

At 814, if the human moves to a third location that is outside the physical area, the activity message is sent to the one or more mobile drive units. For example, in FIG. 1 or 2, when the safety management device 110 determines that the human 118 has left the area 102, the safety management device 110 may instruct the MDUs 106 to perform (or resume performing) a set of activities. To illustrate, the safety management device 110 may send the activity message 540 to the MDUs 106.

FIG. 9 is a flow diagram of an example process 900 that includes instructing mobile drive units to avoid a portion of an area according to some implementations. The process 900 may be performed by the safety management device 110 of FIGS. 1-7.

At 902, a request may be received to create a fixed zone inside an area in which mobile drive units are performing a set of activities. For example, in FIG. 3, the safety management device 110 may receive a request from the human 118 to create the fixed zone 302 in the area 102.

At 904, the mobile drive units may be instructed to place physical barriers around a perimeter of the fixed zone. For example, in FIG. 3, if the barriers 304 include physical barriers, the safety management device 110 may instruct one or more of the MDUs 106 to place the physical barriers around the perimeter of a portion of the area 102 that includes the fixed zone 302.

At 906, the mobile drive units may be instructed to place transmitters around a perimeter of the fixed zone. For example, in FIG. 3, if the barriers 304 include virtual barriers, the safety management device 110 may instruct one or more of the MDUs 106 to place transmitters around the perimeter of the fixed zone 302. The transmitters may transmit a signal to create a virtual barrier that causes the MDUs 106 to avoid entering the fixed zone 302.

At 908, the mobile drive units may be instructed to avoid entering a portion of the area that includes the fixed zone. For example, in FIG. 3, to create a virtual barrier, the safety management device 110 may instruct one or more of the MDUs 106 to avoid entering the fixed zone 302.

At 910, the mobile drive units may be instructed to remove the physical barriers from the perimeter of the fixed zone or remove or turn off the transmitters if a human is no longer present in the fixed zone 302 and/or the fixed 302 is no longer needed. For example, in FIG. 3, if physical barriers were placed around the perimeter of the fixed zone 302, the safety management device 110 may instruct one or more of the MDUs 106 to remove the physical barriers from the perimeter of the fixed zone 302. If a virtual barrier was created using transmitters placed along the perimeter of the fixed zone 302, the safety management device 110 may instruct one or more of the MDUs 106 to remove or turn off the transmitters to remove the virtual barrier.

At 912, the mobile drive units may be instructed to resume performing the set of activities in the area. For example, in FIG. 3, when the safety management device 110 determines that the human 118 is no longer within the area 102, the safety management device 110 may instruct the MDUs 106 to remove physical barriers, remove or turn off transmitters used to create a virtual barrier, or both. After removing any physical barriers and/or virtual barriers, the safety management device 110 may instruct the MDUs 106 to perform the set of activities, e.g., including entering the fixed zone 302 to perform an activity from the set of activities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable storage media storing instructions executable by the one or more processors to perform acts comprising:
  determining one or more drive unit locations corresponding to one or more mobile drive units;
  receiving a query message from individual mobile drive units of the one or more mobile drive units, the query message requesting permission to perform a set of activities;
  transmitting an activity message to the one or more mobile drive units in response to the query message, the activity message instructing individual mobile drive units of the one or more mobile drive units to perform the set of activities within a physical area;
  determining, via a locator device associated with a human, that a first location of the human is within the physical area;
  determining that a first mobile drive unit of the one or more mobile drive units is within a first distance from the first location of the human;
  ceasing transmission of the activity message to the first mobile drive unit, thereby causing the first mobile drive unit to stop performing the set of activities; and
  at least partially in response to ceasing transmission of the activity message to the first mobile drive unit, causing the first mobile drive unit to perform a new action including at least one of a performance of at least a portion, but not all, of the set of activities by the first mobile drive unit, or relocation of the first mobile drive unit to a distance greater than the first distance from the first location of the human.

2. The system of claim 1, the acts further comprising:
determining that a second mobile drive unit is within a second distance from the first location of the human; and
transmitting a slow speed message instructing the second mobile drive unit to reduce a speed at which the second mobile drive unit is travelling within the physical area.

3. The system of claim 1, the acts further comprising:
determining, via the locator device associated with the human, that the human has moved to a second location within the physical area,
determining that a third mobile drive unit of the one or more mobile drive units is within the first distance from the second location of the human; and
ceasing transmission of the activity message to the third mobile drive unit, thereby causing the third mobile drive unit to stop performing the set of activities.

4. The system of claim 1, wherein the query message includes a unique identifier associated with each mobile drive unit, and the activity message transmitted in response to the query message includes the unique identifier.

5. The system of claim 1, the acts further comprising:
determining that the human has moved to a third location that is outside the physical area within which the one or more mobile drive units are performing the set of activities; and
resuming transmission of the activity message instructing individual mobile drive units of the one or more mobile drive units to perform the set of activities within the physical area.

6. The system of claim 1, further including transmitting an instructional message to the first mobile drive unit to cause the first mobile drive unit to perform the new action.

7. The system of claim 1, wherein the causing the first mobile drive unit to perform the new action is based at least in part on a detected change in the location of the human with respect to the mobile drive unit.

8. The system of claim 1, further comprising interrupting a connection of a power source of the first mobile drive unit in response to determining that the first mobile drive unit is within a second distance from the first location of the human.

9. A computer-implemented method, comprising:
determining a drive unit location of a mobile drive unit that is performing a set of activities in a physical area;
determining, via a locator device associated with a human, a location of the human within the physical area;
determining whether the drive unit location is less than a predetermined distance from the location of the human;
in response to determining that the drive unit location is less than the predetermined distance from the location of the human, ceasing transmission of an activity message instructing the mobile drive unit to perform the set of activities, thereby causing the mobile drive unit to stop performing the set of activities; and
at least partially in response to ceasing transmission of the activity message to the first mobile drive unit, causing the drive unit to perform a standby operation that includes pausing the drive unit to await transmission of a command to resume the set of activities.

10. The method of claim 9, further comprising:
in response to determining that the drive unit location is greater than or equal to the predetermined distance from the location of the human, transmitting a message instructing the mobile drive unit to at least one of continue performing the set of activities, navigate away from the location of the human, move to a new location, or reduce a speed of the mobile drive unit.

11. The method of claim 9, further comprising:
in response to determining that the location of the human is outside the physical area, resuming transmission of the activity message instructing the mobile drive unit to perform the set of activities.

12. The method of claim 9, further comprising:
receiving a query message from the mobile drive unit that is performing the set of activities in the physical area, the query message requesting permission for the mobile drive unit to perform the set of activities.

13. The method of claim 12, wherein determining the drive unit location of the mobile drive unit is based at least partly on the query message and comprises:
retrieving a set of location coordinates within the physical area from the query message; and
determining the drive unit location based on the set of location coordinates.

14. The method of claim 12, wherein determining the drive unit location of the mobile drive unit is based at least partly on the query message and comprises:
determining the drive unit location based at least partly on a fiducial marker identifier included in the query message, the fiducial marker identifier corresponding to a location of a fiducial marker read by an imaging device on the mobile drive unit.

15. The method of claim 9, further comprising:
determining the location of the human based at least partly on receiving, from the locator device associated with the human, location data that includes a fiducial marker identifier associated with a fiducial marker read by the locator device.

16. The method of claim 9, further comprising:
determining the location of the human based at least partly on imaging data received from one or more imaging devices located within the physical area, the one or more imaging devices including at least one of a stationary camera fixed in the physical area or a mobile camera mounted on the mobile drive unit, and the imaging data including data associated with at least one of the human or the locator device associated with the human.

17. The method of claim 9, further comprising:
determining the location of the human based at least partly on sensor data provided by one or more sensors located within the physical area, the one or more sensors including at least one of a heat sensor, an infrared sensor, a motion sensor, or a radio frequency identifier (RFID) reader, and the sensor data including data associated with at least one of the human or the locator device associated with the human.

18. A system, comprising:
a mobile drive unit;
a locator device associated with a human; and
a management device configured to perform acts comprising:
initiating transmission of an activity message instructing the mobile drive unit to perform a set of activities within a physical area;
determining a drive unit location of the mobile drive unit;
determining, via the locator device, a location of the human within the physical area;
in response to determining that the drive unit location is less than a predetermined distance from the location of the human, ceasing the transmission of the activity message instructing the mobile drive unit to perform the set of activities, thereby causing the mobile drive unit to stop performing the set of activities; and
at least partially in response to ceasing the transmission of the activity message instructing the mobile drive unit to perform the set of activities, transmitting an instructional message to the mobile drive unit to perform a new action including a relocation of the mobile drive unit to a second drive unit location located greater than the predetermined distance from the location of the human.

19. The system of claim 18, the acts further comprising:
receiving, from the locator device, a fiducial marker identifier associated with a fiducial marker from a plurality of fiducial markers that are located within the physical area; and
determining the location of the human based at least partly on the fiducial marker identifier.

20. The system of claim 18, the acts further comprising:
receiving sensor data from one or more sensors located within the physical area, the one or more sensors including at least one of a heat sensor, an infrared sensor, a motion sensor, an optical sensor, or a radio frequency identifier (RFID) reader; and
determining the location of the human based at least partly on the sensor data, and the sensor data including data associated with at least one of the human or the locator device associated with the human.

* * * * *

UNITED STATES PATENT AND TRADEMARK OFFICE
CERTIFICATE OF CORRECTION

PATENT NO. : 9,927,797 B2
APPLICATION NO. : 14/472717
DATED : March 27, 2018
INVENTOR(S) : Andrew Stubbs et al.

Page 1 of 1

It is certified that error appears in the above-identified patent and that said Letters Patent is hereby corrected as shown below:

On the Title Page

Item (72), change "Andrew Brenden Tinka" to -- Andrew Brendan Tinka --.

Signed and Sealed this
Fifth Day of June, 2018

Andrei Iancu
*Director of the United States Patent and Trademark Office*